US00RE36835E

United States Patent [19]

Shumate et al.

[11] E Patent Number: Re. 36,835

[45] Reissued Date of Patent: Aug. 29, 2000

[54] ELONGATED ARTICLE CARRIER AND METHOD

[76] Inventors: Douglas S. Shumate, 320 Farmington Dr.; Samuel D. Crumpton, 325 Richardson Rd., both of Reidsville, N.C. 27320

[21] Appl. No.: 09/032,463

[22] Filed: Feb. 26, 1998

Related U.S. Patent Documents

Reissue of:

[64] Patent No.: 5,544,798
Issued: Aug. 13, 1996
Appl. No.: 08/323,769
Filed: Oct. 17, 1994

[51] Int. Cl.[7] ..... B60R 9/08

[52] U.S. Cl. ..... 224/402; 224/403; 224/405; 248/121; 211/206; 296/3

[58] Field of Search ..... 224/402, 403, 224/405, 493, 533, 534, 528, 529, 530, 310; 248/121, 122, 123.1, 125; 211/205, 193, 189, 206; 296/3, 10

[56] References Cited

U.S. PATENT DOCUMENTS

| | | | |
|---|---|---|---|
| D. 250,183 | 11/1978 | Marshburn | D12/157 |
| D. 292,504 | 10/1987 | Racicot | D12/156 |
| 3,561,609 | 2/1971 | Doherty et al. | 211/206 |
| 4,152,020 | 5/1979 | Brown et al. | 224/403 |
| 4,405,170 | 9/1983 | Raya | 224/403 |
| 4,527,827 | 7/1985 | Maniscalco et al. | 296/3 |
| 4,770,458 | 9/1988 | Burke et al. | 224/405 |
| 5,090,761 | 2/1992 | Renouard et al. | 296/3 |
| 5,108,141 | 4/1992 | Anderson | 211/189 |
| 5,137,320 | 8/1992 | Christensen | 224/405 |
| 5,354,164 | 10/1994 | Goss et al. | 224/405 |
| 5,439,152 | 8/1995 | Campbell | 224/405 |

*Primary Examiner*—Charles R. Eloshway

[57] ABSTRACT

A elongated article carrier is provided for releasably affixing on the bed of a pickup truck. The elongated article carrier includes a longitudinal member supported by vertical posts and two parallel transverse bars allow two or more canoes to be securely and releasably attached during transportation. The elongated article carrier is lightweight and can be lifted and installed by a single adult.

21 Claims, 2 Drawing Sheets

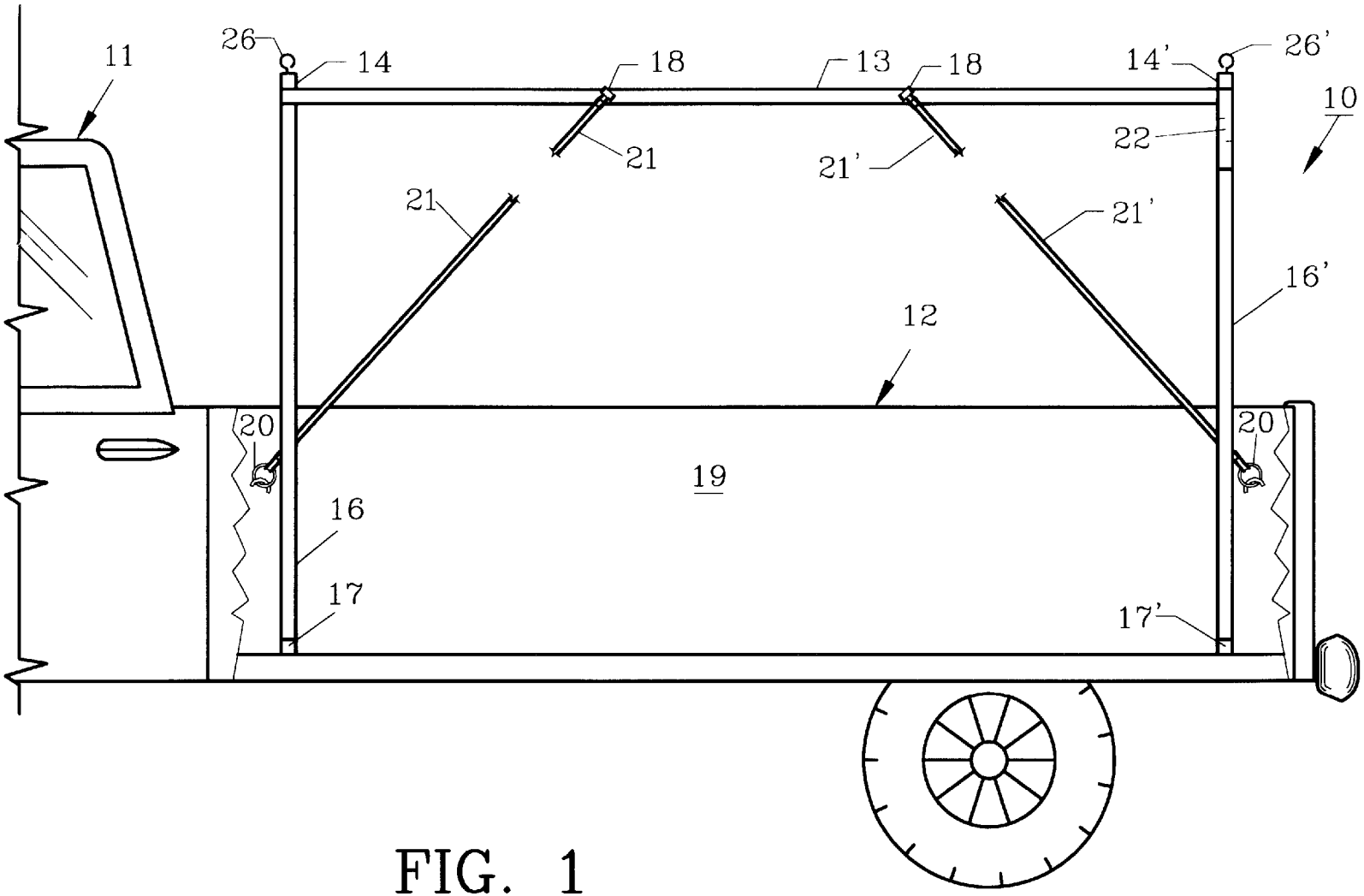
FIG. 1
(AMENDED)

ELONGATED ARTICLE CARRIER AND METHOD

Matter enclosed in heavy brackets [ ] appears in the original patent but forms no part of this reissue specification; matter printed in italics indicates the additions made by reissue.

BACKGROUND OF THE INVENTION

1. Field Of The Invention

The invention herein pertains to devices for transporting elongated articles such as canoes and pertains particularly to transporting several canoes with a conventional pickup truck.

2. Description Of The Prior Art And Objectives Of The Invention

With the increase of canoe enthusiasts in recent years, the need has developed to simplify the transportation of more than one canoe by a single pickup truck. Various racks have been devised in the past for carrying canoes, surfboards, ladders, pipes, boats, and the like by pickup trucks. However, such prior devices are generally heavy, and were more or less permanently installed. As such, a single adult could not easily convert a pickup truck for multi-canoe carrying and much time, effort, and energy had to be spent in installing racks and carriers. Also, many conventional elongated article carriers allowed for transportation of only one canoe at a time and are therefore not feasible and are uneconomical for use by groups of canoe enthusiasts.

With the disadvantages and problems associated with prior art elongated article carriers, the present invention was conceived and one of the objectives is to provide a simple, lightweight elongated article carrier which can be quickly installed and removed from the bed of a pickup truck.

It is another objective of the present invention to provide an elongated article carrier which is formed from aluminum or steel tubing.

It is still another objective of the present invention to provide an elongated article carrier which is relatively inexpensive to manufacture and assemble.

Another objective of the present invention is to provide an elongated article carrier which will allow a standard size pickup truck to carry two or more canoes, simultaneously.

It is yet another objective of the present invention to provide an elongated article carrier which includes a longitudinal member and a pair of parallel transverse bars at each end thereof for supporting and holding the canoe during transportation.

Various other objectives and advantages of the invention will become apparent to those skilled in the art as a more detailed description is set forth below.

SUMMARY OF THE INVENTION

The aforesaid and other objectives are realized by providing an elongated article carrier for placement on the bed of a standard pickup truck for carrying two, three or more canoes, surfboards, or other articles at a time. The elongated article carrier herein is formed from lightweight aluminum tubing of suitable strength and dimensions for its intended purpose and can be lifted and installed by one adult. The elongated article carrier includes a pair of vertical posts that are positioned at the front and rear of the truck bed and at the upper ends, a longitudinal member is affixed. Across the longitudinal member also at each end thereof, is a transverse bar to which are attached I-bolts to affix tie-down straps.

Each tie-down strap includes a buckle or other means to adjust the tautness thereof across the canoes during transportation. The vertical posts have transverse "feet" members affixed thereto to provide vertical stability to the elongated article carrier during transportation.

To prevent movement of the elongated article carrier in the pickup truck bed, stabilizing straps are affixed at one end to rings on the longitudinal member and the opposite ends of the stabilizing straps are affixed to conventional hooks or rings as usually mounted on the inside walls of most pickup trucks.

BRIEF DESCRIPTION OF THE DRAWINGS

FIG. 1 illustrates a side elevational view of a conventional pickup truck with one bed side wall cut-away to show the position of the elongated article carrier therein;

DETAILED DESCRIPTION OF THE PREFERRED EMBODIMENT AND OPERATION OF THE INVENTION

Figure 3:
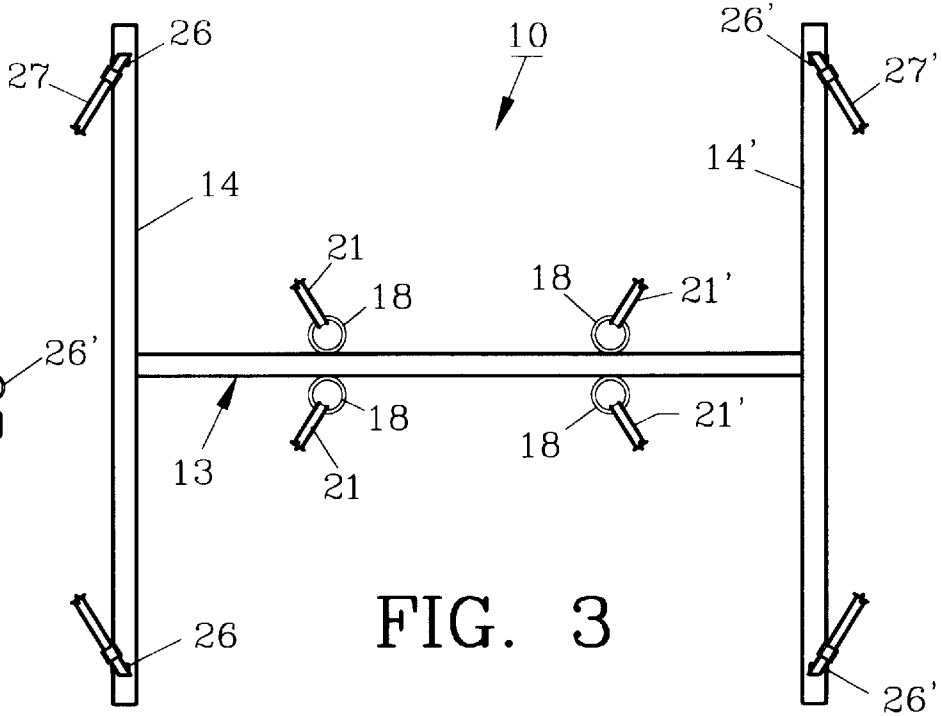
FIG. 3 shows a top planar view of the elongated article carrier as shown in FIG. 2 without the canoes, also removed from the pickup truck.
Figure 2:
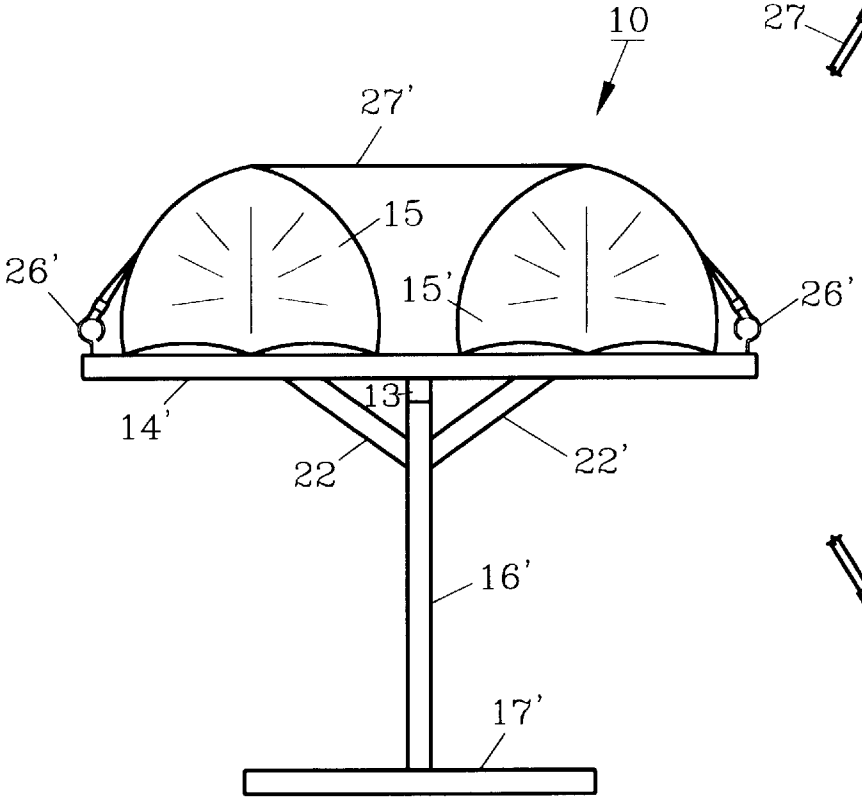
FIG. 2 demonstrates a rear end view of the elongated article carrier with two canoes mounted thereon, as removed from the pickup truck.

For a more complete understanding of the invention and its method of use, turning now to the drawings, the preferred form of the invention is shown in FIGS. 1–3 whereby elongated article carrier 10 (FIG. 1) is depicted on bed 12 of pickup truck 11. One side wall of pickup truck 11 has been cut away to better illustrate the positioning of elongated article carrier 10 therein. As seen, elongated article carrier 10 includes a longitudinal member 13 which extends substantially the length of truck bed 12 although shorter or longer lengths may be used as desired. Longitudinal member 13 preferably comprises one and one half inch square aluminum tubing approximately seven (7) feet in length for convenience, although other sizes, shapes and materials may be utilized as desired. At each end of longitudinal member 13 perpendicular transverse bars 14, 14' which are preferably formed of aluminum tubing also extend approximately four to six feet, depending on the width of the truck being used, the size of the canoe to be carried and the number of canoes, are mounted in parallel such as by welding or bolting. As seen in FIGS. 1,2, and 3 eye bolts 26, 26' are affixed respectively to the transverse members 14, 14'. As seen in FIG. 2 and 3 cargo straps 27, 27' are attached respectively to eye bolts 26, 26'. As seen in FIG. 2, two canoes 15, 15' are secured on transverse bar 14' by cargo strap 27' that is attached to eye bolts 26' which is seen removed from truck 11 for illustrative purposes. Vertical post 16, 16' which are likewise preferably formed from one and one half inch square aluminum tubing approximately five (5) feet in length are also seen in FIG. 1 and are fastened at their lower ends to respectively, post feet 17, 17'.

In a top view of elongated article carrier 10 as shown in FIG. 3, rings 18 are positioned along longitudinal member 13 and are affixed thereto such as by welding or otherwise. Rings 18 provide a means for stabilizing elongated article carrier 10 by affixing it to the inside, side bed walls 19, 19' of pickup truck 11 (19' not shown).

Conventional pickup trucks generally include cargo hooks or rings 20, along the side walls as shown in FIG. 1 which are suitable for attaching stabilizing straps 21, 21' thereto. Stabilizing straps 21, 21' are conventional nylon or elastic straps with standard length adjusting means as commonly used in the industry.

Figure 4:
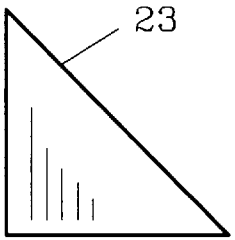
FIG. 4 demonstrates a gusset for alternative bracing of the transverse bars and post feet.

As further shown in FIG. 2, transverse bar 14' is supported by brace members 22, 22' likewise formed from sections of square aluminum tubing. Gusset 23 as shown in FIG. 4 could likewise be used in place of braces 22, 22' and could also be affixed to vertical posts 16, 16' and post feet 17, 17' as required for rigidity. As has been stated earlier, elongated article carrier 10 is relatively lightweight and can be lifted and installed by an adult in less than five minutes. Removal of elongated article carrier 10 from pickup truck 11 is likewise quick, convenient and can be achieved after unloading canoes thereon by disconnecting straps 21, 21'. As earlier stated, elongated article carrier 10 can be bolted, welded or otherwise constructed, depending on the capability and needs of the manufacturer.

The exact overall dimensions and dimensions of the material employed herein are variable and can be modified for a particular usage by those skilled in the art and the illustrations and examples shown are for explanatory purposes and are not intended to limit the scope of the appended claims.

I claim:

1. Apparatus for supporting a canoe above a truck bed during transportation comprising: a first transverse bar, a second transverse bar, a longitudinal member, said first and said second transverse bars each having a middle and being attached to said longitudinal member at opposite ends of said longitudinal member proximate the middle of each of said first and said second transverse bars, a first post, said first post having an upper end and a lower end, said post joined to said longitudinal member to elevate said longitudinal member above said truck bed, means to stabilize said apparatus, said stabilizing means connected to said longitudinal member, and a stabilizer, said stabilizer joined to said stabilizing means and adapted to be joined to the truck bed.

2. Apparatus as claimed in claim 1 and including a second post, said second post joined to said longitudinal member and spaced from said first post.

3. Apparatus as claimed in claim 1 wherein said first and said second transverse bars are attached perpendicularly to said longitudinal member.

4. Apparatus as claimed in claim 1 and including a post foot, said post foot attached to said lower end of said post.

5. Apparatus as claimed in claim 1 and including a means for securing cargo to said apparatus, said cargo securing means affixed to said transverse bar.

6. Apparatus as claimed in claim 6 wherein said cargo securing means comprises an eye bolt.

7. Apparatus as claimed in claim 5 and including a cargo strap, said cargo strap affixed to said cargo securing means.

8. Apparatus as claimed in claim 1 wherein said stabilizing means comprises a ring device.

9. Apparatus as claimed in claim 1 formed from a tubular material.

10. Apparatus for supporting a canoe above a truck bed during transportation thereof comprising a first transverse bar, a second transverse bar, a longitudinal member, said first and said second transverse bars each having a middle and being attached to said longitudinal member at opposite ends of said longitudinal member and proximate the middle of said first and said second transverse bars, a pair of vertical posts, said posts attached to said longitudinal member at opposite ends thereof, a pair of post feet, each of said post feet attached to different posts, means to stabilize said apparatus, said stabilizing means affixed to said longitudinal member, and a stabilizer, said stabilizer joined to said stabilizing means and adapted to be joined to the truck bed.

11. Apparatus as claimed in claim 10 wherein said stabilizing means comprises a ring.

12. Apparatus as claimed in claim 10 and including cargo securing means, said cargo securing means affixed to each of said transverse bars.

13. Apparatus as claimed in claim 12 wherein said cargo securing means is affixed at each end of each of said transverse bars.

14. Apparatus as claimed in claim 10 wherein said cargo securing means comprises eye bolts.

15. Apparatus as claimed in claim 10 and including a transverse bar brace, said brace joined to said [longitudinal member] *first transverse bar* and to said vertical [posts] *post attached to said first transverse bar*.

16. Apparatus as claimed in claim 10 wherein said apparatus is formed from metal tubing.

17. Apparatus as claimed in claim 10, wherein said post feet are each attached to the ends of different posts.

*18. A method of transporting an elongated article above a truck bed with an elongated article carrier having a first transverse bar, a second transverse bar, a longitudinal member, said first and second transverse bars each having a middle and being attached to said longitudinal member at opposite ends of said longitudinal member proximate the middle of each said first and second transverse bars, a first post, said first post having an upper end and a lower end, said post joined to said longitudinal member to elevate said longitudinal member above said truck bed, means to stabilize said carrier, said stabilizing means connected to said longitudinal member, and a stabilizer, said stabilizer joined to said stabilizing means and adapted to be joined to the truck bed, said method comprising the steps of:*

*positioning said elongated article carrier within the truck bed;*

*attaching the carrier to the truck bed;*

*positioning an elongated article atop the carrier, and;*

*releasably attaching the elongated article to the carrier.*

*19. The method of claim 18 including the steps of stabilizing said elongated article carrier within the truck bed.*

*20. The method of claim 18 wherein positioning the elongated article carrier within the truck bed comprises positioning the lower end of the post within said truck bed.*

*21. The method of claim 18 wherein positioning the elongated article carrier within the truck bed comprises the step of manually positioning the elongated article carrier within the truck bed.*

* * * * *